Jan. 20, 1953 J. F. TATUM 2,625,875
THERMAL SHIELDED GRILL
Filed Oct. 23, 1950 2 SHEETS—SHEET 1

INVENTOR
J. F. Tatum
BY
Kimmel & Crowell ATTORNEYS

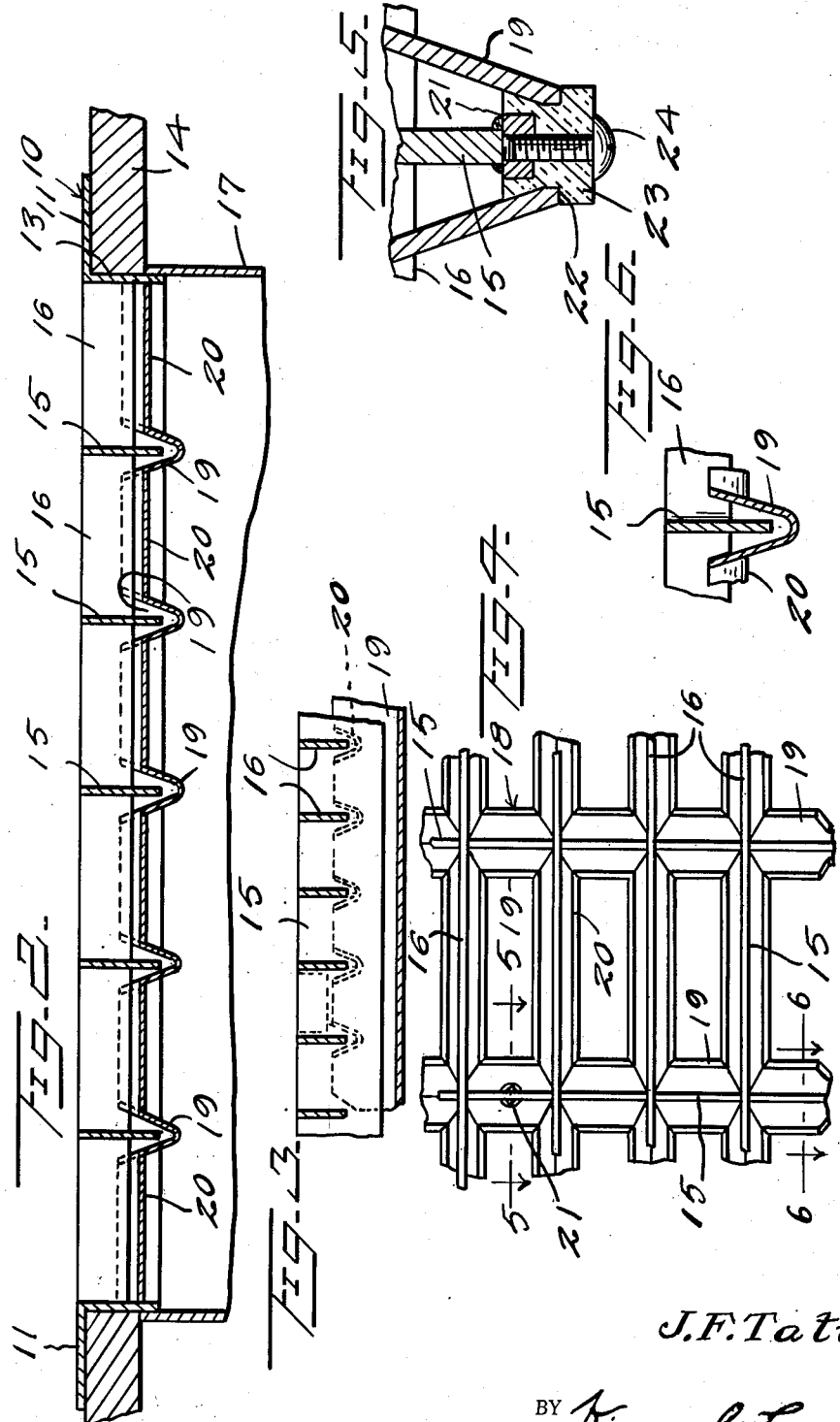

Patented Jan. 20, 1953

2,625,875

UNITED STATES PATENT OFFICE 2,625,875

THERMAL SHIELDED GRILL

Joe F. Tatum, Hattiesburg, Miss.

Application October 23, 1950, Serial No. 191,699

2 Claims. (Cl. 98—101)

This invention relates to a grill or register for hot air furnaces of the floor type.

In heaters or furnaces of the floor type where a single grill or register is positioned in the floor over the hot air flue, it is well known that the grill becomes unduly hot. It is, therefore, an object of this invention to provide an improved grill or register wherein the grill bars overlying the hot air flue are heat insulated so as to materially reduce the temperature thereof.

Another object of this invention is to provide a grill or register of this kind which is of simple construction so that it can be produced at small cost.

With the above and other objects in view, my invention consists in the arrangement, combination and details of construction disclosed in the drawings and specification, and then more particularly pointed out in the appended claims.

In the drawings:

Figure 2 is a sectional view taken on the line 2—2 of Figure 1.

Figure 3 is a fragmentary sectional view taken on the line 3—3 of Figure 1.

Figure 4 is a fragmentary top plan of the grill.

Figure 5 is a fragmentary sectional view taken on the line 5—5 of Figure 4.

Figure 6 is a fragmentary sectional view taken on the line 6—6 of Figure 4.

Figure 1:
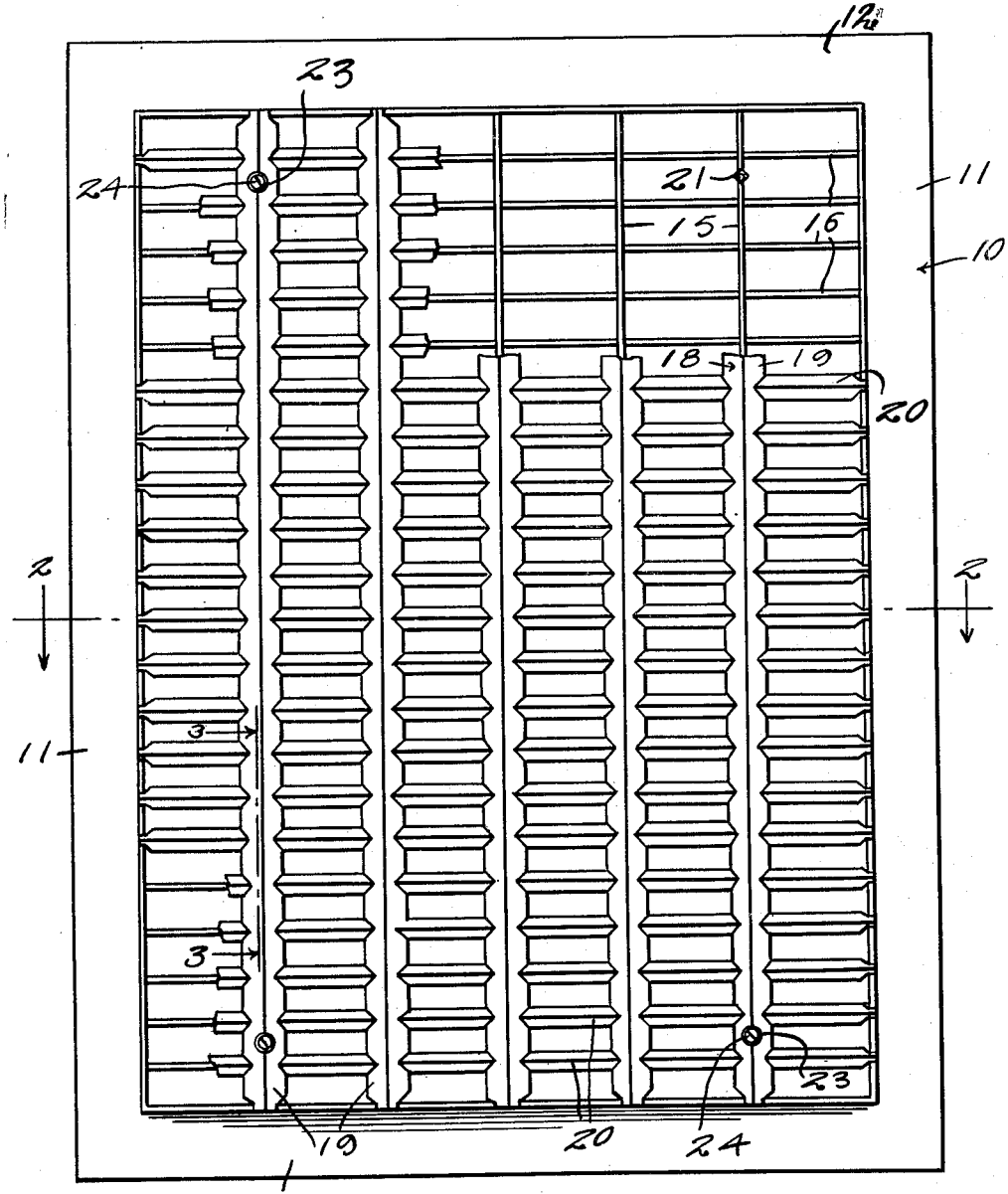
Figure 1 is a fragmentary bottom plan view of a grill or register constructed according to an embodiment of this invention.

Referring to the drawings the numeral 10 designates generally a frame structure which includes flanged opposite side members 11 and flanged opposite end members 12. The frame 10 is adapted to be engaged in an opening 13 formed in a floor 14, the flanges of the frame 10 extending downwardly into the opening 14. The frame structure 10 has mounted therein a plurality of longitudinally disposed parallel grill bars 15 and a plurality of transversely disposed parallel grill bars 16.

In order to provide a means whereby the grill bars 15 and 16 will be maintained in a relatively cool condition when hot air is passing therebetween from a hot air flue 17 which extends downwardly from the grill, I have provided a shield and insulating structure generally designated at 18. The shield and insulating structure 18 includes a plurality of longitudinal members 19 and a plurality of V-shaped transverse members 20. The transverse members 20 may be either soldered, welded, or formed integral with the longitudinal bars 19. The shield 18 is secured beneath the grill bars 15 and 16 by securing nuts 21 to certain ones of the longitudinal bars 15.

The longitudinal shield or baffle members 19 are provided with spaced openings 22, and heat insulating plugs 23 are extended through the openings 22. A screw or other fastening member 24 is extended through the plug 23 and is threaded into the nut 21. As shown in Figures 1 and 6, longitudinal shields or guard members 19 have the apices thereof disposed in downwardly spaced relation to the lower edges of the longitudinal grill bars 15, and in like manner the transverse shield or baffle members 20 are disposed in downwardly spaced relation with respect to the transverse grill bars 16.

Figures 7, 8:
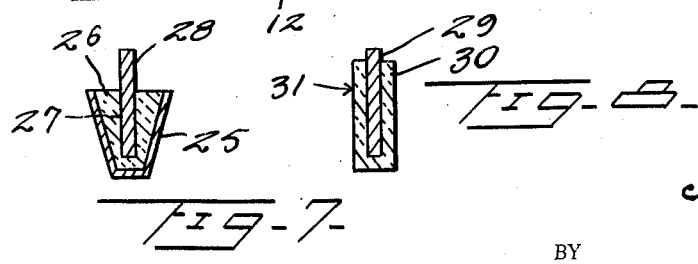
Figure 7 is a fragmentary sectional view of a modified form of this invention.
Figure 8 is a fragmentary sectional view of another modification of this invention.

Referring now to Figure 7 there is disclosed a modified form of this invention wherein the shield members 25 are of truncated V-construction, and V-shaped insulating members 26 are disposed within the shield members 25 and are formed with slots 27 within which the grill bars 28 are adapted to snugly engage. In Figure 8 there is disclosed another modification of this invention wherein the grill bars 29 engage between the parallel sides 30 of U-shaped heat insulating members 31.

In the use of this grill structure the shield or baffle structure 18 is secured to the longitudinal grill bars 15 by means of the screws 24 which engage in the nuts 21. These nuts 21 are secured in spaced apart relation to the longitudinal grill bars 15. The hot air rising upwardly in the spaces between the longitudinal and transverse shield or baffle members 19 and 20 will contact the V-shaped members 19 and 20, and the heat absorbed by the shield or baffle members will not be communicated to the longitudinal and transverse grill bars 15 and 16, respectively, so that these grill bars will be maintained in a relatively cool condition. It will be noted that the upper edges of the baffle or shield members 19 and 20 are disposed a substantial distance below the upper edges of the longitudinal and transverse grill bars so that it will not be possible to contact the shield or baffle members by stepping on the upper edges of the grill bars.

What is claimed is:

1. A grill for hot air ducts comprising a rectangular frame, crossed grill bars fixed in said frame, nuts affixed at spaced intervals to the undersides of said grill bars, and baffle means secured to said bars, said baffle means being formed of crossed channel-shaped members having spaced openings therein aligned with said nuts, and means supporting said members in spaced relation below said bars, said means comprising bushings of insulating material seated in said spaced openings in said channel-shaped members, said bushings having bores therethrough and bolts extending through said bores engaging said nuts.

2. A grill for hot air ducts comprising a rectangular frame, crossed grill bars fixed in said frame, nuts affixed at spaced intervals to the undersides of said grill bars, crossed truncated V-shaped baffle members below said bars, insulating means interposed between said bars and said baffle members having spaced openings therein aligned with said nuts, and means securing said baffle members to said bars, said means comprising bushings of insulating material seated in said spaced openings in said channel-shaped members, said bushings having bores therethrough and bolts extending through said bores engaging said nuts.

JOE F. TATUM.

REFERENCES CITED

The following references are of record in the file of this patent:

UNITED STATES PATENTS

| Number | Name | Date |
| --- | --- | --- |
| 1,924,263 | Truax | Aug. 29, 1933 |
| 2,434,763 | Feinberg | Jan. 20, 1948 |